US009835093B2

(12) United States Patent
Golshany et al.

(10) Patent No.: US 9,835,093 B2
(45) Date of Patent: Dec. 5, 2017

(54) CONTRA-ROTATING OPEN FAN PROPULSION SYSTEM

(71) Applicant: The Boeing Company, Chicago, IL (US)

(72) Inventors: Sina S. Golshany, Lynnwood, WA (US); David Miles Huntly, Seattle, WA (US); Adriana W. Blom, Shoreline, WA (US); Todd W. Erickson, Fife, WA (US); Paul R. Tretow, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 1113 days.

(21) Appl. No.: 14/032,163

(22) Filed: Sep. 19, 2013

(65) Prior Publication Data

US 2015/0078888 A1    Mar. 19, 2015

(51) Int. Cl.
| | | |
|---|---|---|
| *F02C 7/36* | (2006.01) | |
| *F02C 6/20* | (2006.01) | |
| *B64C 27/12* | (2006.01) | |
| *B64D 35/04* | (2006.01) | |
| *F02C 3/36* | (2006.01) | |
| *B64D 35/06* | (2006.01) | |
| *B64C 27/10* | (2006.01) | |

(Continued)

(52) U.S. Cl.
CPC ............... *F02C 7/36* (2013.01); *F02C 6/206* (2013.01); *B64C 11/46* (2013.01); *B64C 27/10* (2013.01); *B64C 27/12* (2013.01); *B64D 35/04* (2013.01); *B64D 35/06* (2013.01); *F02C 3/067* (2013.01); *F02C 3/36* (2013.01); *F05D 2220/325* (2013.01)

(58) Field of Classification Search
CPC ....... B64C 11/46; B64C 11/48; B64C 11/306; B64C 27/10; B64C 27/12; B64D 35/04; B64D 35/06; F02C 3/067; F02C 3/36; F02C 6/206
See application file for complete search history.

(56) References Cited

U.S. PATENT DOCUMENTS

| 4,676,459 A | 6/1987 | Seefluth | |
|---|---|---|---|
| 4,779,488 A * | 10/1988 | Takano | F16H 37/021 192/48.607 |

(Continued)

FOREIGN PATENT DOCUMENTS

| EP | 2615033 A2 | 7/2013 |
|---|---|---|
| EP | 2815981 A1 | 4/2014 |

(Continued)

OTHER PUBLICATIONS

WO_2012062976_A1—original and translation by Espacenet.*

(Continued)

*Primary Examiner* — Woody Lee, Jr.
*Assistant Examiner* — Behnoush Haghighian
(74) *Attorney, Agent, or Firm* — Toler Law Group, PC

(57) ABSTRACT

In one aspect a propulsion system comprises an engine and a drive assembly coupled to the engine, comprising a first driveshaft rotatable in a first direction about a first axis, a first fan coupled to the first driveshaft to rotate in the first direction, and a clutch assembly to selectively disengage the first fan from the first driveshaft. Other aspects may be described.

20 Claims, 13 Drawing Sheets

(51) Int. Cl.
   *B64C 11/46*      (2006.01)
   *F02C 3/067*      (2006.01)

(56) References Cited

U.S. PATENT DOCUMENTS

| | | | | |
|---|---|---|---|---|
| 6,761,144 B2* | 7/2004 | Schwam | ............... | B64D 27/02 |
| | | | | 123/242 |
| 8,382,430 B2 | 2/2013 | Parry et al. | | |
| 8,393,567 B2 | 3/2013 | Moore et al. | | |
| 8,701,381 B2* | 4/2014 | Eames | ............... | B64C 11/346 |
| | | | | 60/39.163 |
| 2007/0130913 A1* | 6/2007 | Harrison | ............... | B64C 11/001 |
| | | | | 60/226.3 |
| 2010/0206982 A1 | 8/2010 | Moore et al. | | |
| 2011/0150645 A1 | 6/2011 | Moore et al. | | |

FOREIGN PATENT DOCUMENTS

| | | | | | |
|---|---|---|---|---|---|
| GB | | 626454 A | * | 7/1949 | ............ B64D 35/00 |
| GB | | 690592 A | | 4/1953 | |
| GB | | 885272 A | | 12/1961 | |
| WO | | 2012062976 A1 | | 5/2012 | |
| WO | WO 2012062976 A1 | * | 5/2012 | ........... B64C 11/306 |

OTHER PUBLICATIONS

Propulsion Noise Reduction Concepts and Progress, Envia, Green Aviation Summit, NASA Ames Research Center, Sep. 8-9, 2010.
NASA Working on 'open rotor' green (but loud) jets, The Register, Jun. 12, 2009.
Zachariadis, Alexios, Contrarotating Open Rotor Operation and Improved Aerodynamics and Noise at Takeoff, Journal of Turbomachinery, vol. 135, May 2013.
Combined Search and Examination Report under Sections 17 and 18(3); UK Intellectual Property Office, Application No. GB1416083.2 (Client Ref. No. P60887GB/RGH), dated Mar. 13, 2015; 6 pages.
Canadian Office Action for Application No. 2,855,442 dated Jan. 23, 2017, 3 pgs.
Second Chinese Office Action dated Feb. 28, 2017 for Application No. 2014103360386, 14 pgs.
Chinese Office Action and Search Report dated Jul. 27, 2016, 9 pgs.
Wikipedia, The Free Encyclopedia. "Tupolev Tu-95. Tu-95MS". Jul. 18, 2013; URL: <web.arehive.org/web/20130718112540/en.wikipedia.org/wiki/File:Tu-95MSZ.svg>, [1 page].
Spanish Search Report dated Jan. 27, 2016; Spanish Patent and Trademark Office, Application No. 201430981, [6 pages].
Canadian Office Action dated Mar. 7, 2016; Application No. 2.855,442; Canadian Intellectual Property Office, [3 pages].

\* cited by examiner

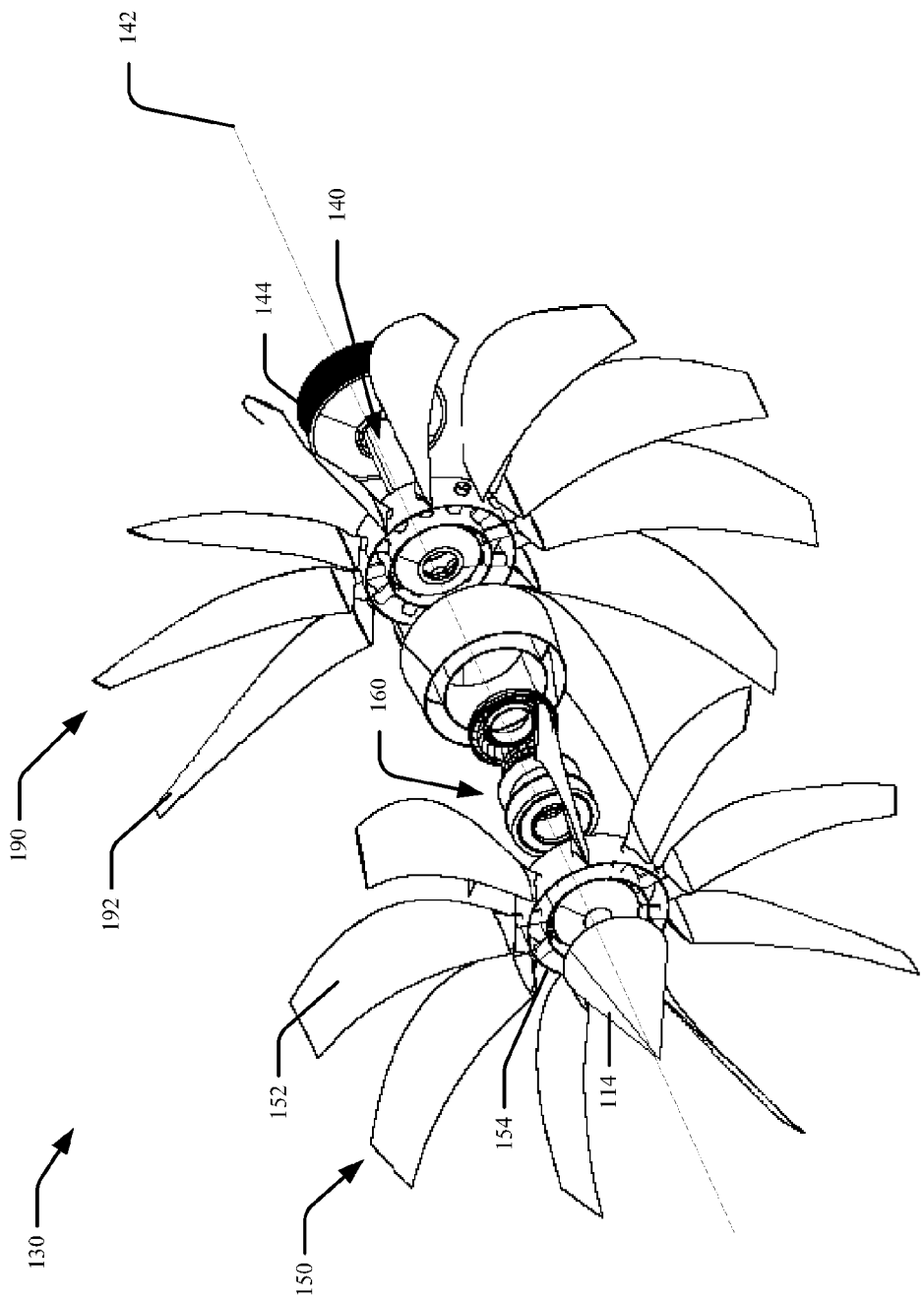

CONTRA-ROTATING OPEN FAN PROPULSION SYSTEM

RELATED APPLICATIONS

None

FIELD OF THE DISCLOSURE

The subject matter described herein relates to aircraft propulsor systems, and more particularly those incorporating a contra-rotating propulsor system which may be incorporated into aircraft engines.

BACKGROUND

Open fan aircraft engines equipped with contra-rotating propulsor systems continue to generate interest in the aviation industry, particularly as fuel prices increase, due to the efficiency of contra-rotating open fan aircraft engines. Contra-rotating propulsor systems are of particular interest due to their efficiency and ability to generate adequate thrust at high speed.

Based on previous experience in the industry, the effective perceived noise levels generated by contra-rotating propulsors exceed noise thresholds set by regulatory agencies for aircraft, which renders use of contra-rotating engine systems for commercial applications problematic. Accordingly, techniques to address the reduction of noise levels in contra-rotating engine systems may find utility.

SUMMARY

In one aspect, a drive assembly comprises a first driveshaft rotatable in a first direction about a first axis, a first fan coupled to the first driveshaft to rotate in the first direction and a clutch assembly to selectively disengage the first fan from the first driveshaft.

In another aspect, a propulsion system comprises an engine and a drive assembly coupled to the engine and comprising a first driveshaft rotatable in a first direction about a first axis, a first fan coupled to the first driveshaft to rotate in the first direction, and a clutch assembly to selectively disengage the first fan from the first driveshaft.

In another aspect, there is provided an aircraft. In one example, the aircraft comprises a fuselage, an engine a drive assembly coupled to the engine, comprising a first driveshaft rotatable in a first direction about a first axis, a first fan coupled to the first driveshaft to rotate in the first direction, and a clutch assembly to selectively disengage the first fan from the first driveshaft.

The features, functions and advantages discussed herein can be achieved independently in various embodiments described herein or may be combined in yet other embodiments, further details of which can be seen with reference to the following description and drawings.

BRIEF DESCRIPTION OF THE DRAWINGS

The detailed description is described with reference to the accompanying figures.

FIGS. 2A-2B are schematic illustrations of a drive assembly, according to a first aspect.

DETAILED DESCRIPTION

Figure 1:
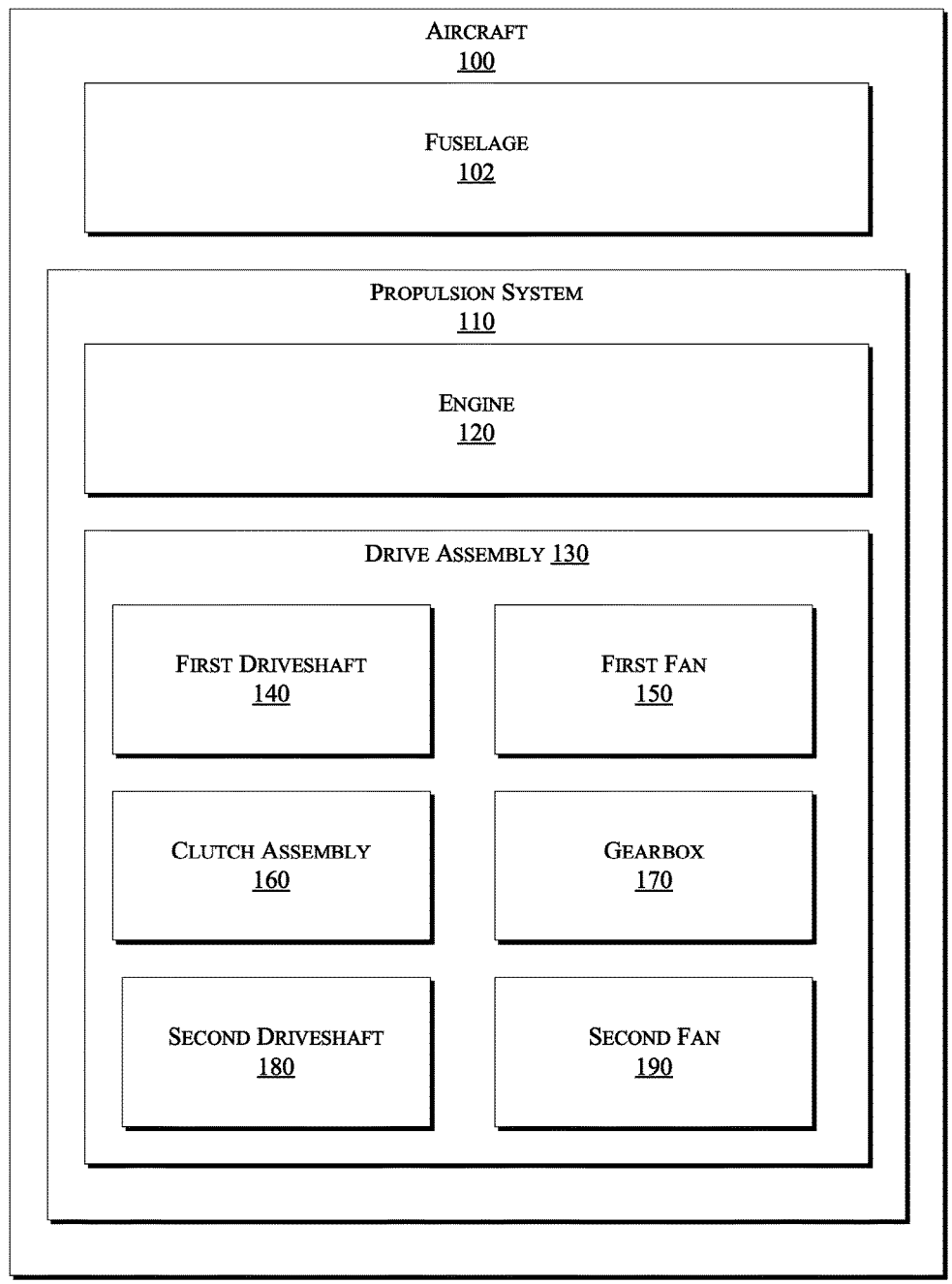
FIG. 1 is a schematic block diagram illustration of an aircraft comprising a contra-rotating open fan propulsion system, according to aspects.

In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

As described above, contra-rotating engine systems generate significant noise due at least in part to air turbulence due to interaction between the two rows of contra-rotating blades. For example, noise is generated when the aft row of blades traverse the low pressure wake generated behind the front row of blades.

The interaction noise is typically comprised of tones resonating at the first blade passage frequency or any integer harmonics of this frequency. Ideal blade passage frequency for a contra-rotating propulsor may be determined using equation 1:

$$\Omega_{BPF} = n(B_1\Omega_1 - B_2\Omega_2) \qquad \text{EQ (1)}$$

In equation (1), $\Omega_{BPF}$ denotes blade passage frequency, $B_1$ denotes front row number of blades, $B_2$ denotes aft row number of blades, $\Omega_1$ denotes front row rotational speed and $\Omega_2$ denotes the aft row rotational speed. Both $\Omega_1$ and $\Omega_2$ are defined to have positive values in the clockwise direction and negative values in the counter clockwise direction.

To eliminate the rotor-to-rotor interaction noise, one would ideally prefer the blade passage frequency to tend to zero. By mathematical deduction, one could observe that blade passage frequency will tend to zero if $B_1$ and $B_2$ as well as $\Omega_1$ and $\Omega_2$ are equal. This is equivalent to a case where both front and aft row have the same number of blades and rotate with exactly the same rotational speed and in the same direction.

Described herein are exemplary drive assembly configurations for contra-rotating engine systems, and propulsion systems and aircraft incorporating such drive assembly configurations. In various aspects, a drive assembly is provided with a clutch assembly to selectively disengage the aft fan of a contra-rotating fan engine system from the driveshaft which provides power to the aft fan. The clutch assembly may be provided as an integral part of the fan gearbox or installed on the output of the fan gearbox.

In some aspects the pitch of the aft row blades may be changed to facilitate its passive rotation, i.e., to windmill under the influence of airflow from the forward fan in the same direction as the forward fan. In other aspects the aft fan may be allowed to spin down under the resistance of the clutch assembly, then reengaged to the driveshaft via a gearbox which drives the aft fan in the same direction as the forward fan. In other aspects, a braking system may be incorporated as an integral part of the clutch assembly to facilitate a faster transition between the two modes. Such system would selectively increasing the resistance induced by the clutch assembly by hydraulic means which leads to a shorter spin-down time for the aft rotor. Thus, a drive assembly constructed in accordance with aspects described herein enables the aft fan of a contra-rotating engine system to be selectively disengaged and fan blades re-pitched, e.g., during landing and take off flight segments or other flight segments in which reducing noise from the aircraft may be useful, and subsequently may be reengaged to drive the aft fan in a contra-rotating configuration.

In this document, a clutch is defined as a device that provides for selective regulation of transmission of torque from the driving component (power source) to the driven component (fan system) when engaged, but it can be disengaged, or partially engaged to allow the continued transmission of a fractional proportion of power. In this application, a clutch could be either a traditional friction clutch (wet or dry) or a fluid coupling device.

FIG. 1 is a schematic block diagram illustration of an aircraft comprising a contra-rotating open fan propulsion system, according to aspects. Referring to FIG. 1, an aircraft 100 comprises a fuselage 102 and a propulsion system 110. Propulsion system 110 comprises at least one engine 120 and drive assembly 130 coupled to the engine 120. The drive assembly 130 comprises a first driveshaft 140, a first fan 150, a clutch assembly 160, a gearbox 170, a second driveshaft 180, and a second fan 190. In operation the clutch assembly 160 enables the first fan 150 to be selectively engaged and disengaged from the first driveshaft 140. Specific examples of drive assemblies and propulsion systems will be described with reference to the following figures.

Figure 2B:
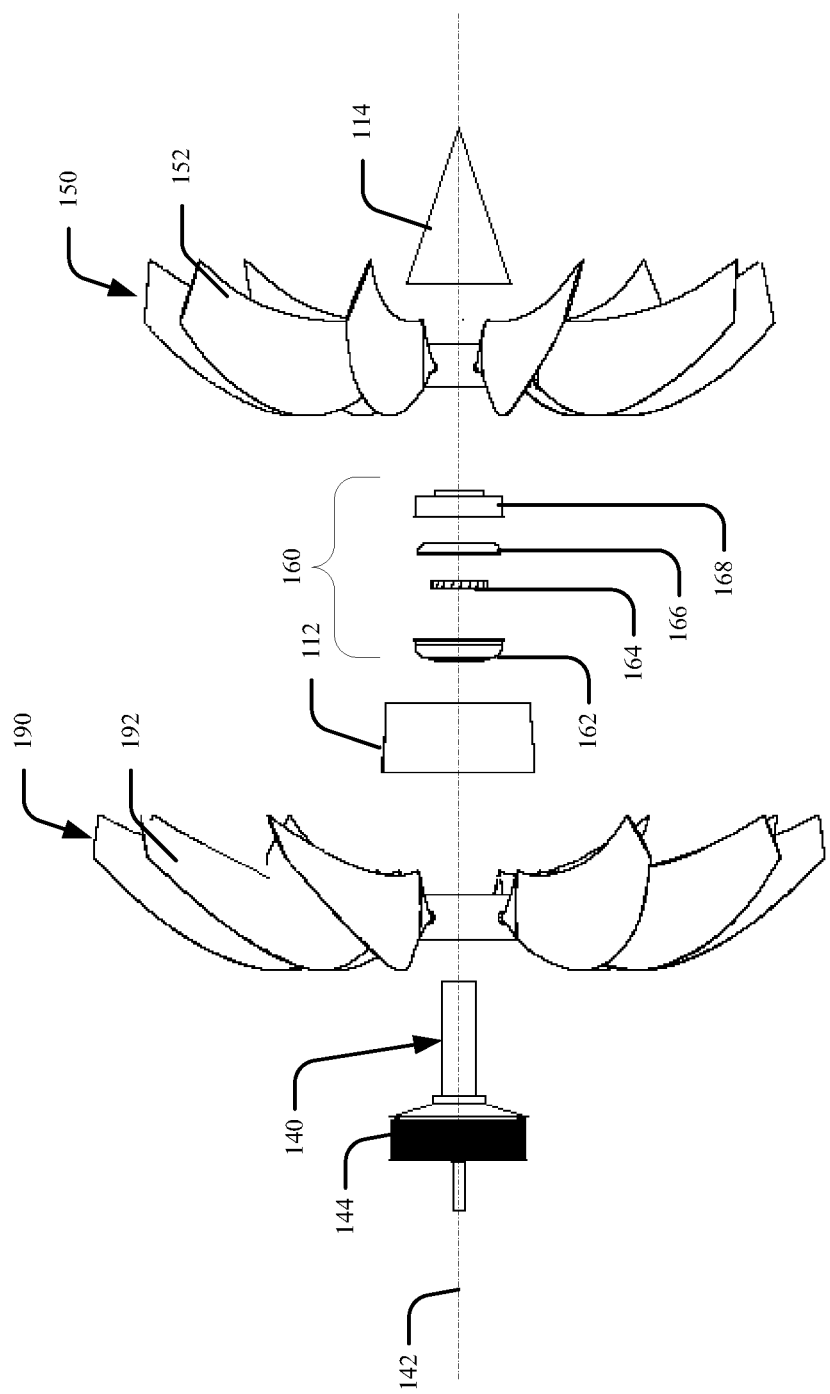
Figure 2C:
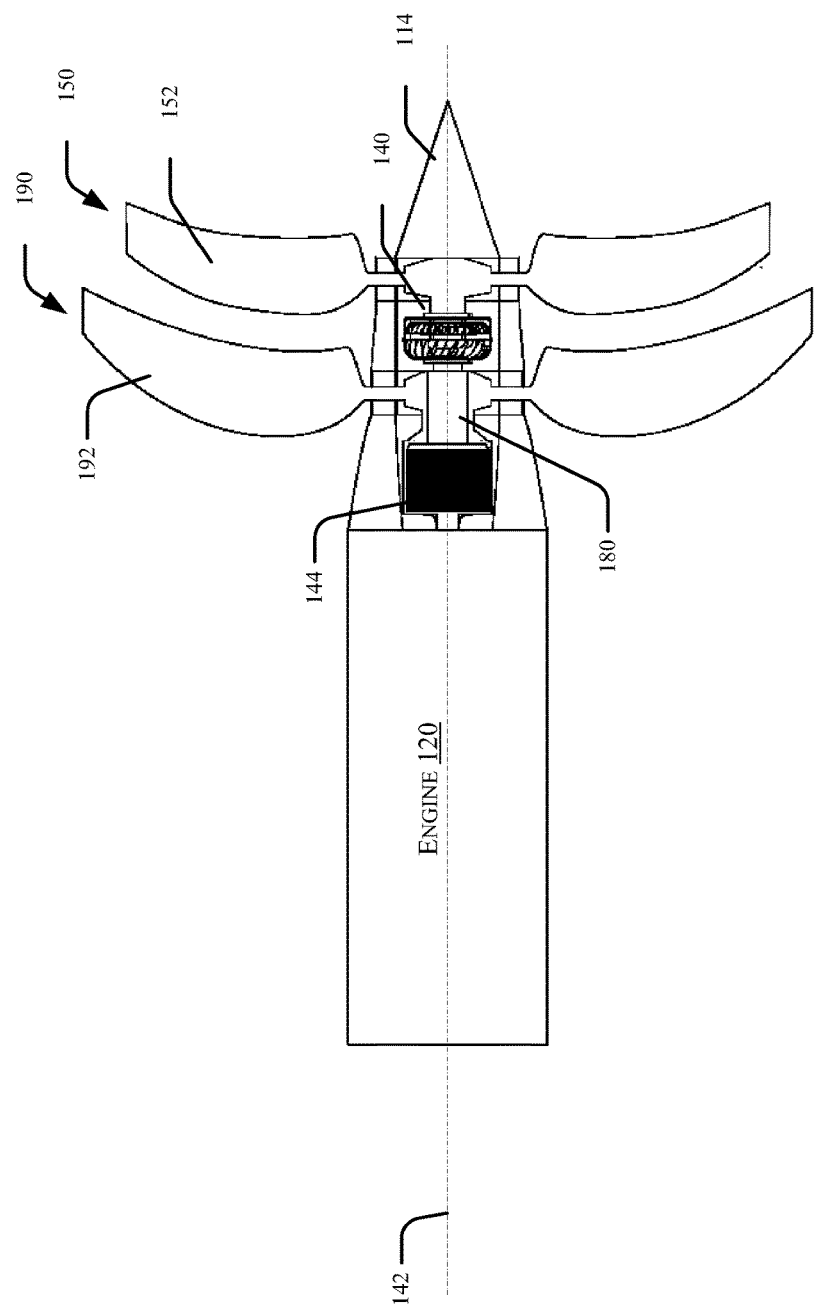
FIG. 2C is a schematic illustration of a propulsion system, according to a first aspect.

FIGS. 2A-2B are schematic illustrations of a drive assembly, and FIG. 2C is a schematic illustration of a propulsion system according to a first aspect. Referring to FIGS. 2A-2C, in a first example a drive assembly 130 includes a first driveshaft 140 rotatable in a first direction about a first axis 142 and a second driveshaft 180 (see FIG. 2C) rotatable in a second direction about axis 142. Driveshafts 140, 180 may be coaxial, such that driveshaft 140 rotates within driveshaft 180. Driveshaft 180 is not shown in FIGS. 2A-2B.

Driveshaft 140, 180 may be coupled to a power source such as engine 120 (FIG. 2C) via a gearbox such as a planetary gearbox 144. Engine 120 and planetary gearbox 144 power the driveshafts 140, 180 to rotate the driveshafts 140, 180 about axis 142.

The specific construction of engine 120 is not critical. In some examples engine 120 may be implemented as a gas turbine engine comprising a multi-stage compressor which provides compressed air to a combustor, which turns turbines to rotate an output shaft. Engine 120 may also be comprised of an electric motor or an internal combustion engine of two or four stroke type. Driveshafts 140, 180 are coupled to the output shaft via planetary gearbox 144. The fan can be located in front or aft of the engine 120, allowing for the propulsor to push (i.e. a pusher engine configuration) or pull (i.e., a puller engine configuration) the engine 120 and subsequently the airplane 100.

A first fan 150 is coupled to the first driveshaft 140 to rotate in a first direction about axis 142 when the first driveshaft 140 is rotated. First fan 150 may be positioned as the aft fan when the drive assembly 130 is coupled to engine 120. First fan 150 comprises a plurality of blades 152 coupled to a hub 154. In some examples the ratio of the diameter of rotor to that of the hub maybe between 0.20 to 0.35. For many applications, the front rotor may have a diameter between 60 inches to 240 inches. Blades 152 may be curved or otherwise contoured to affect the power generation capability of the blades 152.

Further, a second fan 190 is coupled to a second driveshaft 180, visible in FIG. 2C, to rotate in a second direction, different from the first direction, about axis 142 when the second driveshaft 180 is rotated. Second fan 190 may be positioned as the forward fan when the drive assembly 130 is coupled to engine 120. Second fan 190 comprises a plurality of blades 192 coupled to a hub 194.

In some examples the second fan 190 and fan blades 192 may be designed to generate sufficient thrust at takeoff and climb-out while aft fan 152 is not engaged with the driveshaft 140. This can be achieved by increasing the diameter of the second fan 190, as the net thrust generated by a fan is proportional to the forth power of the fan diameter. For example, the thrust generated by fan 190 would be increased by as much as fifty percent (50%) if the diameter of fan 190 is increased by nineteen percent (19%). In some examples, blades 192 measure between about 40 inches and 200 inches in length and 4 inches and 35 inches in width. Blades 192 may be curved or otherwise contoured to affect the propulsive efficiency of the blades 192 at high speed. When assembled the first fan 150 and the second fan 190 are displaced along axis 142 by a distance that measures between 0.02 and 0.35 of the overall front row fan diameter. This distance is typically related to the activity factor of the blades and is determined either (1) experimentally, or (2) via unsteady computational fluid dynamics analysis.

A core duct 112 houses the clutch assembly 160 and an exhaust plug 114 is fitted adjacent the second fan 190.

A clutch assembly 160 is provided to selectively disengage the first fan 150 from the first driveshaft 140. In some examples clutch assembly 160 may be a fluid coupling system, or a friction (wet or dry) clutch system. In the example depicted in FIGS. 2A-2C clutch drive assembly 160 comprises an impeller 162, a stator 164, a turbine 166, and a casing 168. Impeller 162 may be coupled to driveshaft 140 such that impeller 162 rotates with driveshaft 140. Turbine 166 may be coupled to an output shaft which is, in turn, coupled to the hub 154 of first fan 150. Clutch assembly 160 may be filled with a fluid, typically an oil, to provide a fluid coupling between impeller 162 and turbine 166. Stator 164 functions to align the direction of fluid flowing from the turbine to the impeller in a manner as is known in the art.

Clutch assembly 160 may be coupled to a hydraulic circuit system which increases or decreases the pressure of fluid in the clutch assembly 160 to increase or decrease, respectively, the amount of input power that is transmitted by the clutch assembly 160. Clutch assembly 160 also regulates the resistance applied to the turbine during the spin-down process to facilitate a more rapid change between the two modes of the device. Examples of hydraulic circuits are described below with reference to FIGS. 5A and 5B.

In the examples illustrated in FIGS. 2A-2C the first fan 150 is free to rotate passively (i.e., to windmill) with an adequate blade pitch angle under the influence of airflow from the second fan 190 after the first fan 150 is disengaged from the driveshaft 140. In the examples illustrated in FIGS. 3A-3C and 4A-4C a gearbox 170 is coupled to the first fan 150 to allow the first fan 150 to be driven in the same direction as the forward fan 190.

Figure 3A:
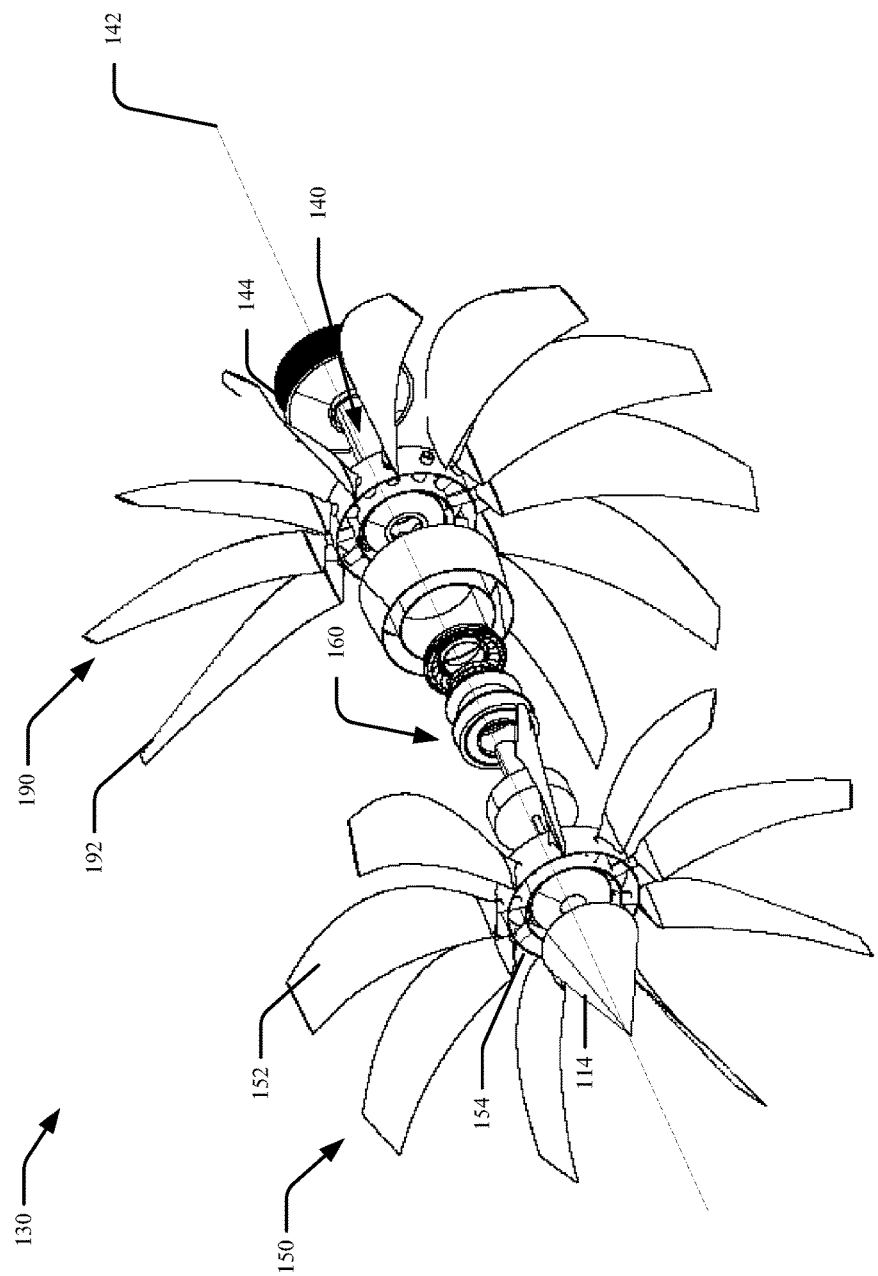
FIGS. 3A-3B are a schematic illustrations of a drive assembly, according to a second aspect.
Figure 3B:
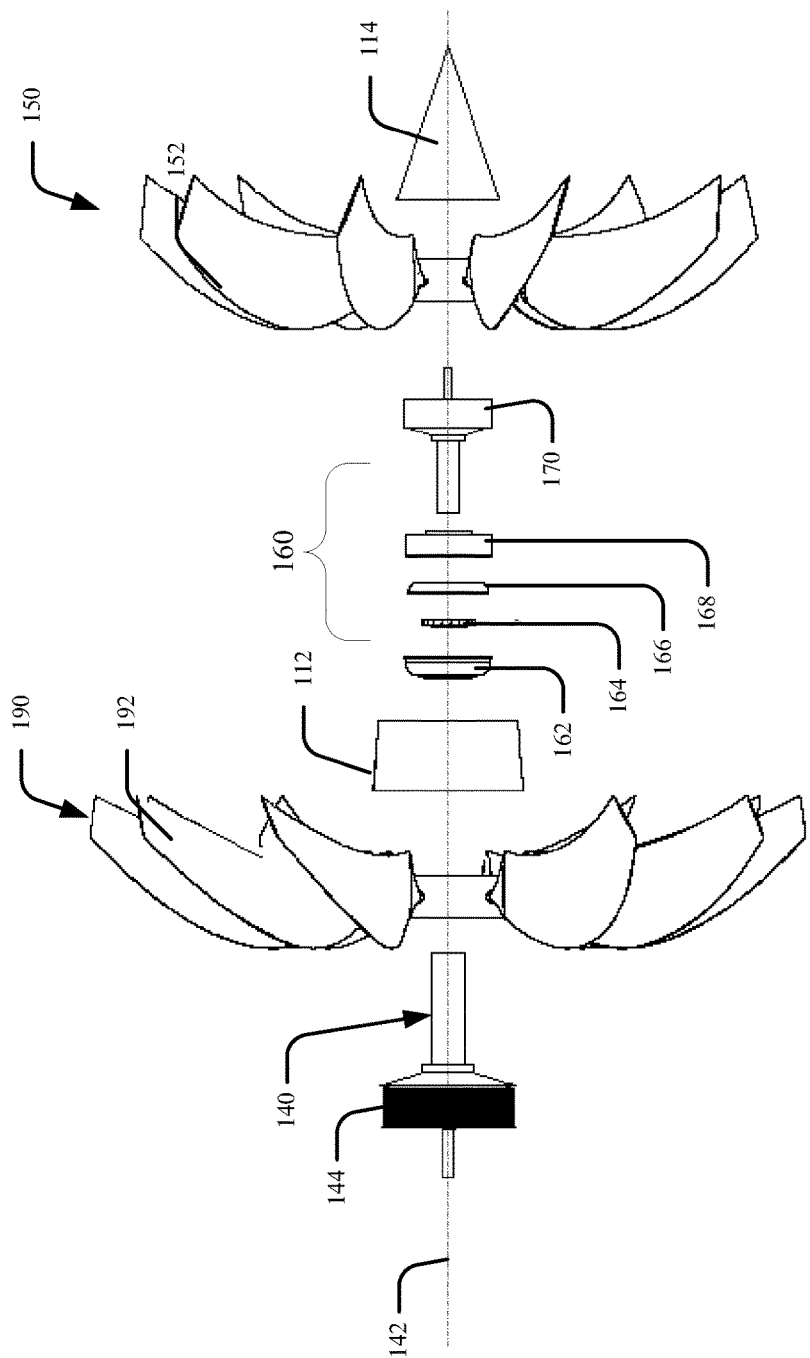
Figure 3C:
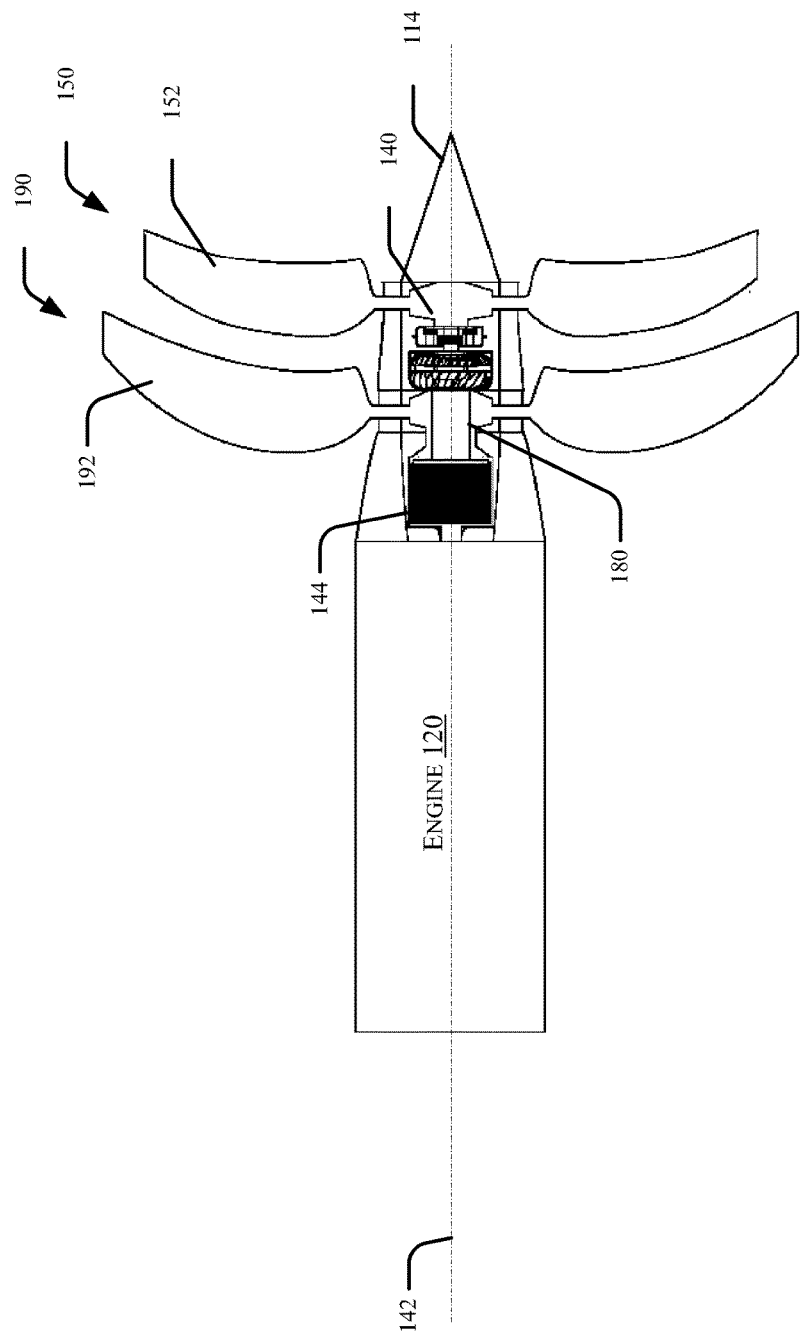
FIG. 3C is a schematic illustration of a propulsion system, according to a second aspect.

Referring first to the example illustrated FIGS. 3A-3C, the output shaft of the clutch assembly 160 may be provided as an input to a gearbox 170. Gearbox 170 may be implemented as a reversible gearbox which selectively reverses the direction or rotation of the input shaft. Thus, in the example illustrated in FIGS. 3A-3C the clutch assembly 160 may be activated to disengage the first fan 150 from the driveshaft 140, and the first fan 150 may be allowed to spin down, assisted by the increased viscous resistance acting in the clutch assembly 160. Subsequently the direction of the output of reversing gearbox 170 may be changed and the clutch assembly 160 may be activated to reengage the second fan with the driveshaft to drive the first fan 150 in the opposite direction while the blades are pitched in the adequate orientation for wind milling, such that the second fan 150 rotates in the same direction as the first fan 150.

The remaining components illustrated in FIGS. 3A-3C are substantially the same as the corresponding components described with reference to FIGS. 2A-2C. In the interest of clarity, the description of these components will not be repeated.

Figure 4A:
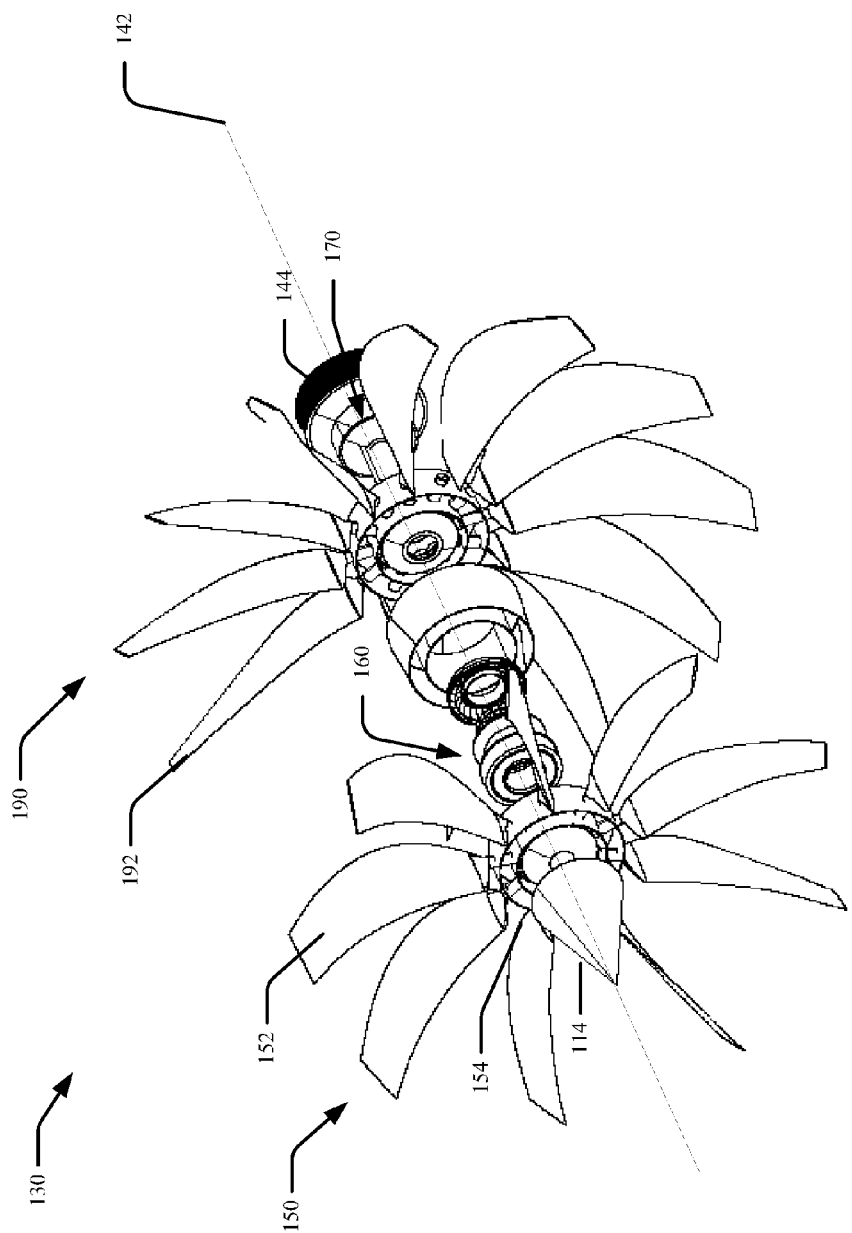
FIGS. 4A-4B are schematic illustrations of a drive assembly, according to a third aspect.
Figure 4B:
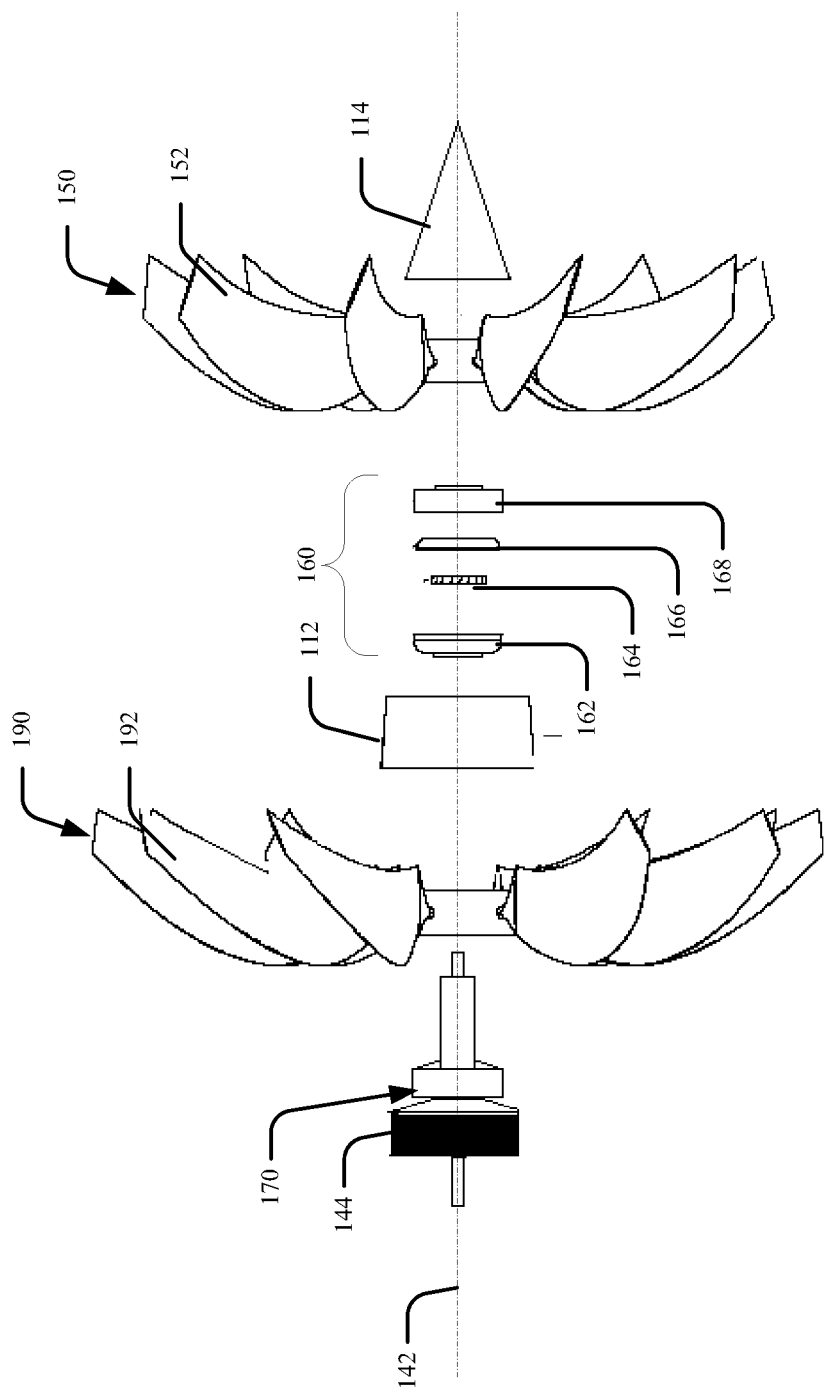
Figure 4C:
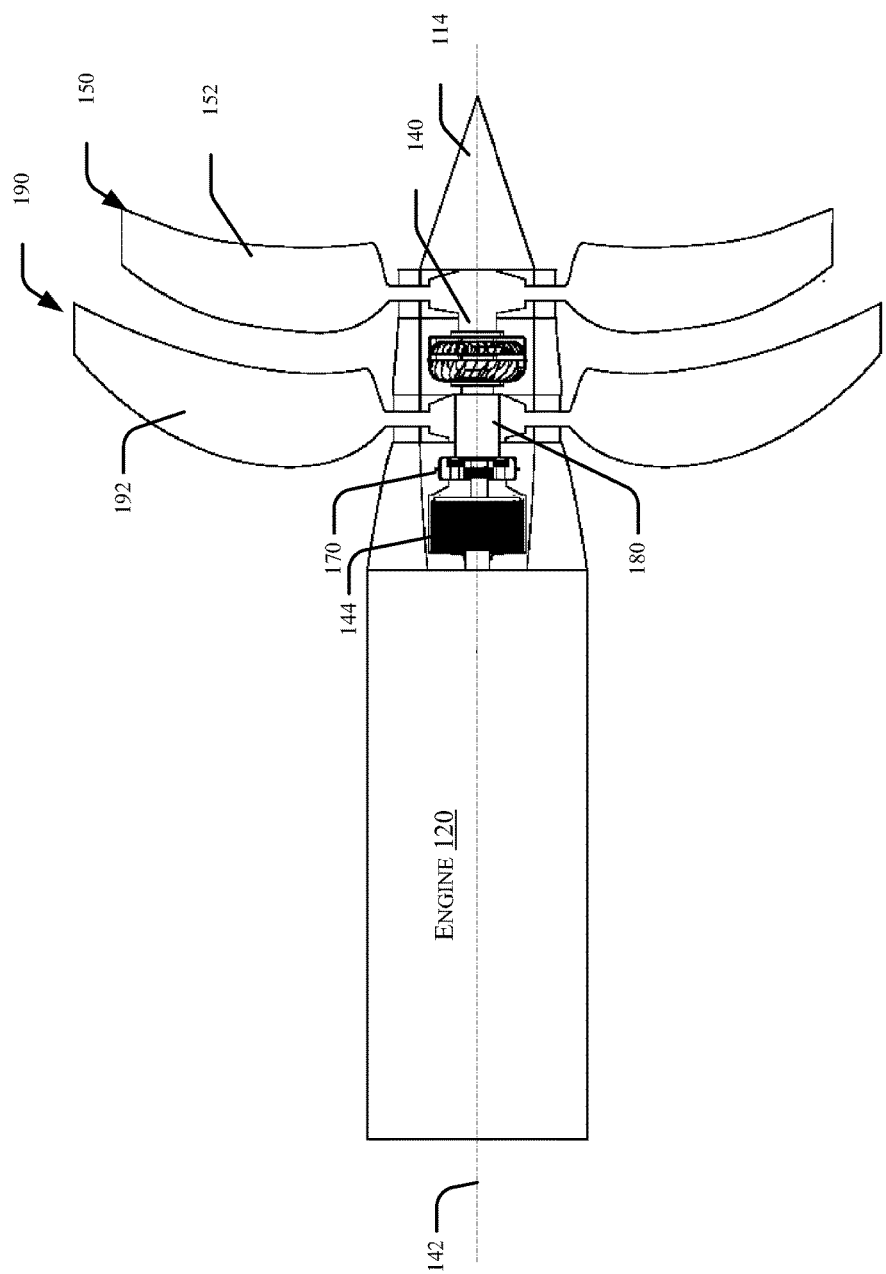
FIG. 4C is a schematic illustration of a propulsion system, according to a third aspect.

Referring next to the example illustrated in FIGS. 4A-4C, the output shaft of the planetary gearbox 144 may be provided as an input to a gearbox 170. Again, gearbox 170 may be implemented as a reversible gearbox which selectively reverses the direction or rotation of the input shaft. Thus, in the example illustrated in FIGS. 4A-4C the clutch assembly 160 may be activated to disengage the first fan 150 from the driveshaft 140, and the first fan 150 may be allowed to spin down and come to a full stop under the resistance induced in the clutch assembly 160. Subsequently the direction of the output of reversing gearbox 170 may be changed and the clutch assembly 160 may be activated to reengage the second fan with the driveshaft to drive the first fan 150 in the opposite direction, such that the first fan 150 rotates in the same direction as the second fan 190.

The remaining components illustrated in FIGS. 4A-4C are substantially the same as the corresponding components described with reference to FIGS. 2A-2C. In the interest of clarity, the description of these components will not be repeated.

Figure 5A:
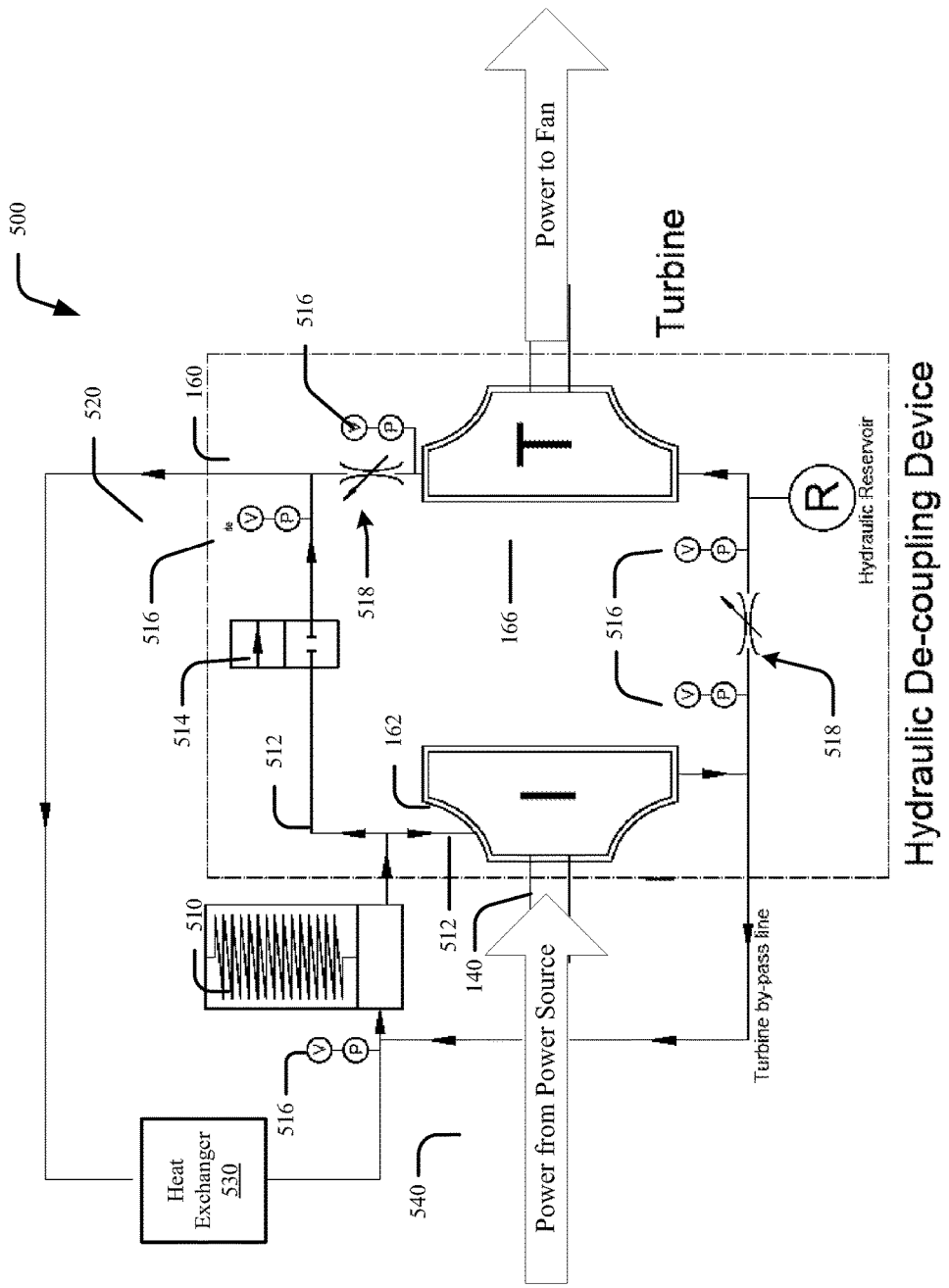
FIGS. 5A and 5B are examples of hydraulic circuits according to aspects.
Figure 5B:
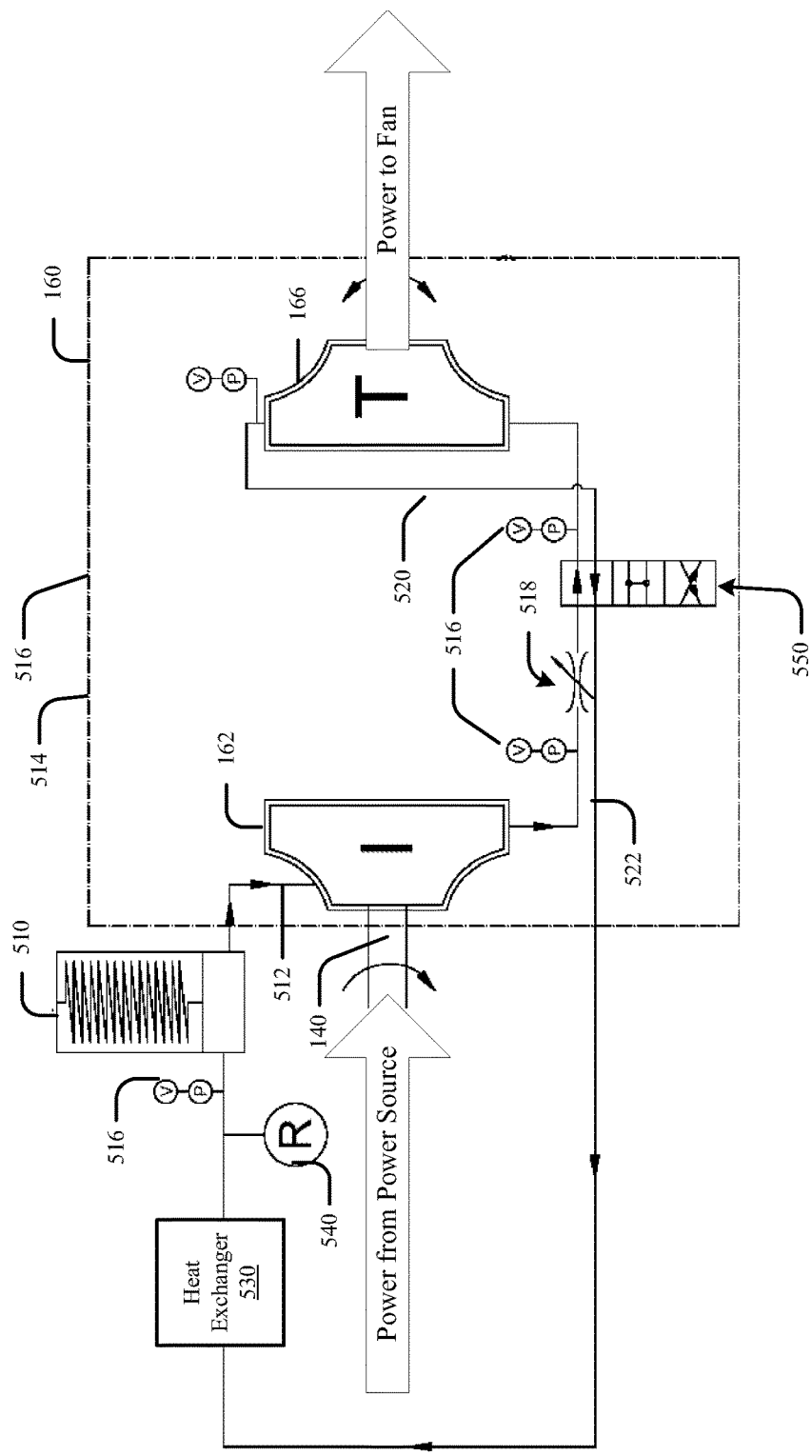

FIGS. 5A and 5B are examples of hydraulic circuits which may be used to regulate the clutch assembly 160 to selectively couple and decouple the first fan 150 from the first driveshaft 140, or decelerate the first fan 150 according to aspects. Referring first to FIG. 5A, in one example a hydraulic circuit 500 comprises a hydraulic accumulator 510 which maintains pressure on a hydraulic fluid. A first supply line 512 couples the hydraulic accumulator 510 to the impeller 162 and to a one-way valve 514 which is switchable between an open position in which hydraulic fluid can flow through the valve 514 and a closed position in which hydraulic fluid cannot flow through the valve 514.

A first variable flow rate valve 518 regulates the flow of hydraulic fluid between the impeller 162 and the turbine 166. Pressure and flow rate sensors 516 monitor the pressure and flow rate of hydraulic fluid on both sides of first variable flow rate valve 518.

Hydraulic fluid may exit the turbine 166 via line 520. A second variable flow rate valve 518 regulates the flow of hydraulic fluid from the impeller 162. Pressure and flow rate sensors 516 monitor the pressure and flow rate of hydraulic fluid exiting the impeller 162.

Hydraulic circuit 500 further includes a heat exchanger 530 to exchange heat from the hydraulic fluid. A reservoir 540 is provided to store hydraulic fluid which overflows from the circuit 500.

In operation, power from the power source (e.g., the engine 120) is applied to the impeller 162 to rotate the impeller 162. When the valve 514 is closed such that hydraulic fluid cannot flow through valve 514, the hydraulic fluid flows to the impeller 162, which drives the turbine 166, such that the clutch assembly 160 engages the first fan 150 from the driveshaft 140.

To disengage the first fan 150 from the engine the variable flow rate valve 518 is closed to reduce the flow of high pressure fluid from impeller 162 to turbine 166, thereby reducing the amount of power transmitted to the fan 150. When the amount of fluid passing through impeller 162 drops sufficiently power is no longer transmitted between impeller 162 and the turbine 166, thereby disengaging the fan 150 from the driveshaft 140.

To facilitate a faster spin down of the first fan 150, the one-way valve 514 may be switched to the open position, thereby allowing pressurized fluid stored in accumulator 510 to flow into the turbine 166 in a direction which is reversed from nominal operation of the turbine 166. Under the pressure of the reversed flow, the internal resistance induced on turbine 166 will increase, therefore facilitating a more rapid spin-down of the first fan 150. The transient manner in which the reverse flow from accumulator 510 is applied can be managed via variable flow valve 518. The reverse flow could continue for such length of time as to allow the accumulator 510 to be fully depressurized and fluid in the circuit attaining ambient pressure. The length of time to depressurize the accumulator 510 would depend on the maximum capacity of the accumulator 510, maximum allowable pressure in accumulator 510 and line 512, mass moment of inertia of the fan 150, the speed of rotation of the fan 150 at the moment when valve 518 was closed, aerodynamic resistance of the fan 150, and the efficiency of turbine 166. The design of the hydraulic system is driven by the maximum size and allowable pressure of the accumulator 510 and the desired length of time for fan 150 to reach a full stop. A practical value for the spin-down time may vary from 15 to 80 seconds, depending on operational considerations pertaining to aircraft 100.

FIG. 5B is a second example of a hydraulic circuit 500 to selectively couple and decouple the first fan 150 from the first driveshaft 140, according to aspects. Many components of the circuit 500 depicted in FIG. 5B are the same as the analogous components depicted in FIG. 5A, and in the interest of clarity these components will not be described in detail. Referring first to FIG. 5B, the circuit 500 includes a 3-way directional valve 550 coupled to lines 520 and 522 that is switchable between an open position in which hydraulic fluid can flow through lines 520 and 522, a closed position in which hydraulic fluid cannot flow through lines 520 and 522, and a switch position which lines 520 and 522 are switched at valve 550.

In operation, when the valve 550 is in the open position hydraulic fluid flows under pressure from hydraulic accumulator 510 into clutch assembly 160 and to impeller 162 via line 512. Impeller 162 drives the turbine 166, such that the hydraulic drive 160 engages the first fan 150 from the driveshaft 140.

When the valve 550 is in the closed position hydraulic fluid cannot flow between the impeller 162 and the turbine 166, thereby disengaging the fan 150 from the driveshaft 140.

When the valve 550 is in the switch position hydraulic fluid flows under pressure from the impeller 162 through line 520 into turbine 166 in a reverse direction, effectively acting as a brake on turbine 166, to facilitate a more rapid spin-down of fan 150.

Figure 6:
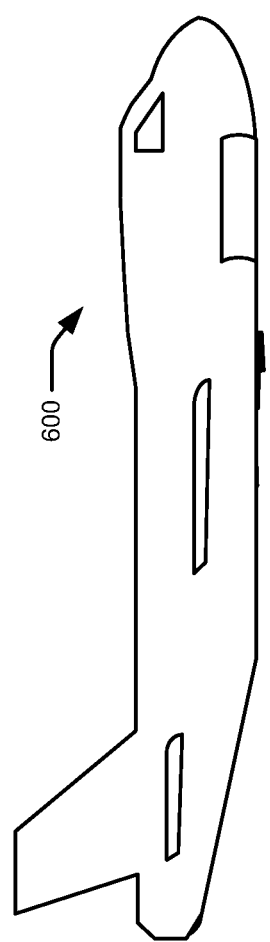
FIG. 6 is a schematic view of an aircraft according to aspects.

A propulsion system as described herein may be mounted on an aircraft to provide propulsion to the aircraft. By way of example, referring to FIG. 6, a propulsion system as described herein may be mounted on a aircraft 600 such as an airplane, spacecraft or the like.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A drive assembly comprising:
    a first driveshaft rotatable in a first direction about a first axis;
    a first fan coupled to the first driveshaft and configured to rotate in the first direction; and
    a clutch assembly configured to selectively disengage the first fan from the first driveshaft and configured to adjust a resistance with respect to rotation of the first fan in the first direction while the first fan is disengaged.

2. The drive assembly of claim 1, wherein the clutch assembly comprises a hydraulic clutch and a braking system.

3. The drive assembly of claim 2, further comprising a gearbox coupled to the first driveshaft between an engine and the first fan, wherein the gearbox is configured to drive the first fan in a second direction, opposite the first direction.

4. The drive assembly of claim 2, further comprising:
    a second driveshaft rotatable in a second direction, different from the first direction; and
    a second fan coupled to the second driveshaft, wherein the first driveshaft and the second driveshaft are coaxial.

5. The drive assembly of claim 4, wherein the first fan and the second fan are displaced by a distance that measures between 0.02 and 0.35 the distance of an overall front row fan diameter.

6. A propulsion system comprising:
    an engine; and
    a drive assembly coupled to the engine, the drive assembly comprising:
        a first driveshaft rotatable in a first direction about a first axis;
        a first fan coupled to the first driveshaft and configured to rotate in the first direction; and
        a clutch assembly configured to selectively disengage the first fan from the first driveshaft and configured to adjust a resistance with respect to rotation of the first fan in the first direction while the first fan is disengaged.

7. The propulsion system of claim 6, wherein the clutch assembly comprises a fluid coupling clutch, wherein the clutch assembly includes a multi-directional hydraulic control circuit configured to adjust the resistance, and wherein the multi-directional hydraulic control circuit comprises a multi-position valve, a multi-loop hydraulic circuit, or a combination thereof.

8. The propulsion system of claim 7, further comprising a gearbox coupled to the first driveshaft between an engine and the first fan.

9. The propulsion system of claim 6, further comprising:
    a second driveshaft rotatable in a second direction, different from the first direction; and
    a second fan coupled to the second driveshaft.

10. An aircraft comprising:
    a fuselage;
    an engine coupled to the fuselage; and
    a drive assembly coupled to the engine, the drive assembly comprising:
        a first driveshaft rotatable in a first direction about a first axis;
        a first fan coupled to the first driveshaft and configured to rotate in the first direction; and
        a clutch assembly configured to selectively disengage the first fan from the first driveshaft and configured to adjust a resistance with respect to rotation of the first fan in the first direction while the first fan is disengaged.

11. The aircraft of claim 10, wherein the clutch assembly comprises a fluid coupling clutch and a braking system.

12. The aircraft of claim 11, further comprising a gearbox coupled to the first driveshaft between an engine and the first fan, wherein the gearbox is configured to drive the first fan in a second direction, opposite the first direction.

13. The aircraft of claim 10, further comprising:
    a second driveshaft rotatable in a second direction, different from the first direction; and
    a second fan coupled to the second driveshaft.

14. The drive assembly of claim 1, wherein the clutch assembly comprises:
    an impeller coupled to the first driveshaft; and
    a turbine fluidly coupled to the impeller and coupled to the first fan.

15. The drive assembly of claim 14, further comprising one or more valves of a clutch control circuit configured to reduce or stop hydraulic fluid from flowing from the impeller to the turbine, wherein reducing or stopping the hydraulic fluid from flowing from the impeller to the turbine disengages the first fan from the first driveshaft.

16. The drive assembly of claim 14, further comprising a clutch control circuit configured to selectively control pressure and direction of hydraulic fluid flowing into the turbine, wherein the clutch control circuit includes a multi-directional hydraulic control circuit configured to adjust the resistance.

17. The drive assembly of claim 14, wherein the clutch assembly is configured such that hydraulic fluid flows from the impeller into the turbine in the first direction to rotate the first fan, and further comprising a clutch control circuit configured to selectively direct the hydraulic fluid into the turbine in a second direction to increase viscous resistance within the turbine, wherein increasing the viscous resistance within the turbine resists the rotation of the first fan.

18. The propulsion system of claim 7, further comprising a clutch control circuit that includes the multi-directional hydraulic control circuit, wherein the clutch control circuit is configured to selectively increase hydraulic pressure in the clutch assembly to control power output by the clutch assembly.

19. The propulsion system of claim 18, wherein the clutch control circuit further includes:
    an accumulator configured to store hydraulic fluid under pressure and to provide pressurized hydraulic fluid to a turbine of the clutch assembly; and one or more valves in fluid connection with the accumulator.

20. The propulsion system of claim 7, wherein the multi-directional hydraulic control circuit comprises the multi-position valve having at least two positions including a first position and a second position, the first position configured to direct hydraulic fluid from an impeller of the clutch assembly into a turbine of the clutch assembly in the first direction, and the second position configured to direct the hydraulic fluid from the impeller into the turbine in a second direction.

* * * * *